United States Patent
Pohl

(10) Patent No.: US 7,878,291 B2
(45) Date of Patent: Feb. 1, 2011

(54) REAR AXLE STEERING SYSTEM FOR A MOBILE CRANE

(75) Inventor: Klaus Pohl, St. Wendel (DE)

(73) Assignee: Terex Demag GmbH (DE)

( * ) Notice: Subject to any disclaimer, the term of this patent is extended or adjusted under 35 U.S.C. 154(b) by 0 days.

(21) Appl. No.: 12/317,414

(22) Filed: Dec. 22, 2008

(65) Prior Publication Data
US 2009/0133954 A1  May 28, 2009

Related U.S. Application Data

(63) Continuation of application No. PCT/EP2007/005300, filed on Jun. 15, 2007.

(51) Int. Cl.
*B62D 5/30* (2006.01)
(52) U.S. Cl. .................... 180/408; 180/410
(58) Field of Classification Search ............. 180/403, 180/405, 407, 408, 410
See application file for complete search history.

(56) References Cited

U.S. PATENT DOCUMENTS

| | | | | |
|---|---|---|---|---|
| 3,603,424 A | * | 9/1971 | Blood et al. ............... | 180/6.3 |
| 4,702,358 A | * | 10/1987 | Mueller et al. ............. | 192/13 R |
| 5,341,893 A | * | 8/1994 | Fukui et al. ............... | 180/245 |
| 6,076,626 A | | 6/2000 | Bohner et al. | |
| 6,279,674 B1 | | 8/2001 | Lissel et al. | |
| 6,374,940 B1 | * | 4/2002 | Pickert ..................... | 180/406 |
| 6,786,296 B2 | * | 9/2004 | Guldner et al. ............ | 180/402 |
| 2007/0289804 A1 | * | 12/2007 | Takeuchi et al. ........... | 180/402 |

FOREIGN PATENT DOCUMENTS

| | | |
|---|---|---|
| DE | 196 05 553 C1 | 8/1997 |
| DE | 102 45 618 A1 | 4/2004 |
| DE | 196 32 251 B4 | 8/2004 |
| DE | 10 2005 011 613 A1 | 10/2005 |
| DE | 10 2004 034 126 A1 | 2/2006 |

* cited by examiner

*Primary Examiner*—Tony H. Winner
(74) *Attorney, Agent, or Firm*—Cantor Colburn LLP

(57) ABSTRACT

A rear axle steering system for a mobile crane includes at least one actively steered rear axle with wheels arranged thereon. A rear axle steering system of this type is provided with a hydraulic steering system including one or more hydraulic steering cylinders of which a particular number are in each case associated with an actively steered rear axle in order to steer this actively steered rear axle in a desired manner. A braking system is adapted to individually brake each wheel of the at least one actively steered rear axle. In the event of an error in the hydraulic steering system, a control system actuates the braking system in such a way that by selective braking of at least one wheel of the actively steered rear axle, which is affected by this error, the rear axle is brought to a predetermined, desired steering position. A method of steering a rear axle, with wheels of a mobile crane arranged thereon, by means of a hydraulic steering system.

13 Claims, 7 Drawing Sheets

REAR AXLE STEERING SYSTEM FOR A MOBILE CRANE

CROSS-REFERENCE TO RELATED APPLICATIONS

This application is filed under 35 U.S.C. §120 and §365(c) as a continuation of International Patent Application PCT/EP2007/005300, filed Jun. 15, 2007, which said application claims priority from German Patent Application No. 10 2006 028 957.9, filed Jun. 23, 2006, which applications are incorporated herein by reference in their entirety.

FIELD OF THE INVENTION

The present invention relates to a rear axle steering system for a mobile crane including at least one actively steered rear axle with wheels arranged thereon. The invention further relates to a method of steering a rear axle with wheels of a mobile crane arranged thereon, the rear axle being actively steered by a hydraulic steering system if there is an error in the normal operation of the rear axle steering system.

BACKGROUND OF THE INVENTION

Mobile cranes are currently produced with telescopic booms or lattice booms which, due to their size, often comprise three or more axles of which in most cases at least one rear axle is actively steered.

For instance, a mobile crane is produced and distributed under the name AC 100 by Terex Demag GmbH & Co. KG located in Zweibrücken—Germany, the mobile crane comprising a chassis with five axles on which is mounted a rotatable superstructure with an extendable telescopic boom. The two front axles of this mobile crane are steered in the usual way, the first rear axle is rigid and the last two rear axles are steered actively.

One of the large mobile cranes with telescopic boom produced and distributed by Terex Demag GmbH & Co. KG/Zweibrücken—Germany is the so-called AC 200-1 TP which comprises seven axles of which the first two front axles are steered, the two in the middle are not steered when used on roads, and the other three rear axles are again actively steered. In this mobile crane, all actively steered rear axles are steerable to avoid errors caused by individual, separate rear-axle steering systems. The track-guiding front axles are usually adjusted via the steering wheel, a steering gear with a hydraulic support mechanism, and steering arms in their angular position, in other words the steering angle.

The force and steering movement is transmitted from the (several) front axle(s) to the actively steered rear axles either via mechanical arms, as it is the case in the first-mentioned smaller mobile crane, or via an electronic-hydraulic steering system, as it is the case in the last-mentioned large mobile crane AC 200-1 TP, for example. When the electronic-hydraulic rear-axle steering system is selected, the mechanical coupling to the front axles is dispensed with. This facilitates the illustration of different steering geometries. It is easily possible, for instance, to move the vehicle diagonally with all wheels being turned in the same direction. Likewise, a mechanically decoupled electronic-hydraulic rear axle steering system of this type permits a vehicle to be steered away from a wall. In that case, the steering line lies on or behind the last rear axle. Moreover, this enables one to turn corners with extremely narrow radii. In this case, the steering line lies approximately in the center of the vehicle. Electronic-hydraulic rear axle systems of this type also permit free steering, which means that the actively steerable rear axles is steered independently of the front axles, by using corresponding, associated computer systems. All these steering systems mentioned above are speed-dependent. Consequently, this results in a high maneuverability when driving slowly and in a high straight-running stability when driving fast.

Mobile cranes of the above-described type are not only used on construction sites which are closed to the public but are in particular allowed on public roads, and must therefore fulfill high safety requirements. A mobile crane of the above type must be safely controllable even in the event of an error. Usually, in order to ensure safe maneuverability even when the mobile crane is equipped with several actively steered rear axles, various fall-back levels are defined which can be achieved by means of various system concepts.

For instance, a so-called centering system is known for steering the respective rear axle to a zero-degree position. Hydraulic centering systems of this type are for example available from Mobil Elektronik, Bössingerstrasse 31-33, D-74243 Langenbrettach-Langenbeutingen. A hydraulic centering system of this type is also described in DE 102 45 618 A1, for example. As disclosed therein, each rear axle of the active rear axle steering system for a mobile crane comprises in each case two hydraulic steering cylinders and one hydraulic centering cylinder. Associated with the respective hydraulic centering cylinder are safety valves which are actuable by means of a directional control valve in such a way that they close in the event of an error so as to prevent further steering movement of the rear axles. These rear axles are in turn associated with in each case one safety valve which, in the event of a given driving situation, acts upon the centering cylinder in such a way that the associated rear axle is steerable back into the neutral position while the steering cylinders are no longer acted upon for steering displacement in a particular direction. By means of the centering cylinders, this design is meant to ensure that the associated rear axle is steerable back into the neutral position, wherein a control computer initially closes only the shut-off valves which are provided according to the invention, while the current steering position is maintained, with the result that the cornering behavior is initially maintained when the error is detected. Upon detection of a change in direction of the steering movement, the safety valve is active in such a way that the steered rear axle associated therewith is steered to the neutral position where it remains until the error is corrected.

Furthermore it shall be noted that a maximum vehicle speed may be provided as the driving situation in which the rear axles are to be steered back into the neutral position. In this case, the rear axles should be back in the neutral position as soon as a maximum vehicle speed of usually between 25 km/h and 50 km/h is reached. The active rear wheel steering system may thus be used for maneuvering during the operation of the mobile crane. When driving on roads, however, it is ensured that the steerable rear axles are in the neutral position so as to achieve a good straight-running stability at higher speeds.

Another prior-art system concept is the so-called locking system. This system ensures that in the event of an error, the respective actively steered rear axle remains in its position. A prior-art locking system, as it is for example also shown in the attached drawing explained below, is available from Mobilelektronik.

In a so-called release system, it is provided that the actively steered rear axle is configured as a trailing axle which is switched to be released in the event of an error in such a way that it follows the vehicle. This so-called release system is for example also described in the mentioned DE 102 45 618 A1.

Finally, there are combinations of the above-named systems in which, depending on the type of error, the respective actively steered rear axle is either locked or centered or released.

A combination of this type is for example described in DE 102 45 618 A1, and the electronic equipment required for a system of this type is again provided by Mobilelektronik.

All systems mentioned above are so-called fail-safe systems. A fail-operational system, which is a redundant system that continues to steer the vehicle in the event of an error, is again known from Mobilelektronik.

The active rear axle steering system according to the above described DE 102 45 618 A1 is problematic in that the hydraulic centering cylinder for in each case one actively steered rear axle and the associated hydraulic adjustment valves etc. are expensive and elaborate and therefore require a corresponding amount of space.

A device and a method of steering a vehicle with at least two steerable wheels is shown in DE 196 32 251 B4, the device comprising a steering unit for adjusting the positions of the steerable wheels in dependence on a steering setpoint signal and a unit for generating a steering behavior of the vehicle in the event of an error of the steering unit. The unit, which generates a steering behavior, is an existing braking unit which, in the event of a faulty steering system, generates selectively different braking forces acting on the wheels in dependence on the steering setpoint signal. If the error detection unit detects an error in the steering unit, the error detection unit switches off the steering unit. Simultaneously, it activates the braking unit by means of a control signal in such a way that braking forces are selectively exerted on the wheels in dependence on the steering setpoint signal, thus ensuring that the steering reactions commanded by the steering unit, which is actuable by the driver, or by an automatic vehicle guidance unit are performed.

A steering system for multi-lane vehicles is disclosed in DE 196 05 553 C1. This steering system is equipped with an emergency steering system which, in dependence on the actuation of a steering handle, is able to actuate wheel brakes on different sides of the vehicle to different extents. Likewise, as in the previously explained DE 196 32 251 B4, the sole object thereof is to steer the entire vehicle via the braking unit by applying a yaw moment.

For the purpose of a comprehensive discussion, it is necessary to mention the disclosures DE 10 2004 034 126 A1 and DE 10 2005 011 613 A1. DE 10 2004 034 126 A1 discloses a road vehicle with a steer-by-wire system. This steer-by-wire system comprises a manually actuated steering element, a sensor which detects the steering position of the steering element, and a steer-by-wire element which cooperates with steerable wheels of the vehicle. The steer-by-wire system further comprises an electronic stabilization system for the vehicle, which is actively connectable to the brakes of the vehicle, as well as a yaw rate sensor. In the event of an implausibility between the sensor of the steering element and the yaw rate sensor, a fall-back level of the steer-by-wire system is active in this system which uses the function of the electronic stabilization program to generate a steering movement of the vehicle corresponding to the steering position of the steering element and to bring the vehicle to a standstill. DE 10 2005 011 613 A1 discloses a regulation system for brake-steer-assisted parking. This regulation system is however only intended for a two-axle vehicle where it is meant to replace a four-wheel steering system with a high parking maneuverability by a more cost-effective two-wheel steering system for the front axle, combined with a brake-steering system for the rear axle.

BRIEF SUMMARY OF THE INVENTION

The technical problem underlying the invention is to provide an improved active rear axle steering system for a mobile crane.

This technical problem is solved by an active rear axle steering system for a mobile crane including at least one actively steered rear axle with wheels. A hydraulic steering system of the rear axle steering system includes several steering cylinders of which a particular number are in each case associated with an actively steered rear axle in order to steer this actively steered rear axle to a desired position. Moreover, a braking system is provided which is adapted to brake each wheel of the at least one actively steered rear axle individually. According to the invention, there is now only one control system which, in the event of an error that affects the steering process by means of the hydraulic steering system of the actively steered rear axle, actuates the braking system in such a way that a predetermined, desired steering position is achieved by selective braking of at least one wheel of the actively steered rear axle that is affected by this error.

The invention is based on the idea to either use an already existing braking system or a new braking system for an actively steered rear axle, which is especially installed for the purpose to brake the wheels individually in the event of an error to selectively steer the rear axle, strictly speaking the wheels arranged thereon. If an error occurs in the steering system when turning to the right, for example, when seen in the driving direction, the steering position of the rear axle, which is now no longer actively steerable, should be determined first when such an error occurs so that the vehicle is able to follow the curved path which had previously been commanded by the driver. This is possible in the conventional way by means of the hydraulic valves, or the steering angle can be maintained by specifically braking the wheels. In prior-art systems, when it was necessary to steer the vehicle in the other direction to return to a straight position, this was done by centering cylinders which were needed to steer the rear axle to the neutral position. Now, the rear axle can be steered to the neutral position by specifically braking the wheels; when braking the left wheel of the no longer actively steerable rear axle, for example, this rear axle is steered to the left as required. The usually provided ABS braking systems, which are sufficiently known and do not require any further explanation, or modifications thereof, allow selective and defined braking of individual wheels of an actively steered rear axle in order to achieve the desired position.

The redundancy, which is required in addition to the braking system of the actively steered rear axle in a mobile crane of the mentioned type, is thus for the first time provided a braking system which is known per se.

As already explained above, a prior-art centering system is prone to errors due to the large number of associated components. A less complex locking system as it is known per se, combined with the present invention in which a rear axle, which is affected by an error, can be brought to a predetermined steering position in the event of an error by selective braking of the wheels associated with this rear axle, comprises fewer components, thus making the system less prone to errors and therefore more reliable.

Compared to prior-art redundant systems in which all parts that are prone to errors are duplicated, the number of components is greatly reduced according to the invention, with the result that such a system according to the invention may even be less expensive.

The prior-art centering system with the large centering cylinders explained at the outset requires a lot of space since the centering cylinder needs to be much larger than the associated steering cylinders. In a rear axle steering system according to the invention, the centering cylinders are dispensed with, with the result that the entire rear axle system can become much smaller.

Likewise, the system according to the invention no longer requires a manual emergency actuation system, as it was provided in systems for hydraulically locking an actively steered rear axle in the event of an error. Since according to the invention, a manual emergency actuation system is no longer required, the required shut-off valve may be installed directly on the steering cylinders, if necessary. This ensures that a previously disadvantageous but inevitable elasticity of the hydraulic hoses no longer needs to be taken into account, which also results in a higher straight-running stability of the actively steered rear axle.

Consequently, an active rear axle steering system according to the invention may be produced at lower costs than a prior-art centering system with separate steering cylinders and centering cylinders. An active rear axle steering system according to the invention could be less prone to errors since it comprises fewer components. Moreover, a rear axle steering system according to the invention may enable one to continue driving even after the failure of a rear axle steering system.

An exemplary embodiment of a rear axle steering system according to the invention for a mobile crane, which comprises one or more actively steered rear axles with wheels arranged thereon, has a setpoint angle sensor on a steered front axle of the mobile crane. In this exemplary embodiment, a first actual angle sensor as well as a second actual angle sensor, which takes over the function thereof in the event of an error, are associated with an actively steered rear axle. An embodiment of this type has the advantage that in the event of a faulty actual angle sensor, the rear axle is steerable by means of the values supplied by the second actual angle sensor. If there is an additional error in the steering system of the actively steerable rear axle, a predefined, desired steering position is still attainable according to the invention by selective braking of at least one wheel of the only actively steered rear axle on the basis of the values supplied by the second actual angle sensor.

In another exemplary embodiment of a rear axle steering system according to the invention, it is provided that a first setpoint angle sensor as well as a second setpoint angle sensor, which takes over the function thereof in the event of a faulty first setpoint angle sensor, are associated with a steered front axle of the mobile crane. An embodiment of this type ensures that even in the event of a faulty setpoint angle sensor and/or a faulty steering system of an actively steered rear axle, a faulty active rear axle steering system remains steerable by means of the inventive brake steering system. In order to do so, the desired steering position of the active rear steering system is calculated by means of the second setpoint angle sensor, thus ensuring that the active rear steering system remains steerable by means of the invention, even in the event of an error.

In yet another exemplary embodiment of a rear axle steering system according to the invention, the steering system is designed such that in the event of an error, for instance in the hydraulic steering system, the braking system is controlled by means of an ABS (anti-lock brake system) control device in such a way that by selectively braking at least one wheel of the actively steered rear axle, which is affected by this error, a predetermined, desired steering position is achieved. In this embodiment, an already existing ABS control unit such as an ABS control device is thus for the first time used for selective braking and, consequently, steering of the affected steerable rear axle. If a conventional program of the ABS control device does not permit selective steering of the affected rear axle, the functions thereof are—in another exemplary embodiment of the rear axle steering system according to the invention— replaced by the new control system according to the invention. It is understood that this replacement is only temporary, so with respect to the invention, this may in particular mean that the conventional ABS regulation is simply replaced by another type of regulation or by a regulation which is adapted accordingly. For the sake of completeness, it shall be noted that in the present case, the terms control and regulation are generally interchangeable.

Another exemplary embodiment of the rear axle steering system according to the invention is designed in such a way that in the event of an error in the hydraulic steering system, the braking system is actuated by means of an EBS (electronic braking system) control device in such a way that a predetermined desired steering position is achieved by selective braking of at least one wheel of the actively steered rear axle that is affected by this error. An EBS control device is thus for the first time used for selective braking of an actively steered rear axle in order to achieve a desired steering position. Instead of the EBS control device, an ASR (anti slip regulation) system may alternatively be used as well. In another exemplary embodiment of an actively steered rear axle steering system according to the invention, two steering cylinders are associated with each of the actively steered rear axle. If one steering cylinder fails, for example, the control system according to the invention will activate the brakes of the wheels of the affected rear axle. The affected rear axle therefore remains steerable in the above described manner despite the failure of a steering cylinder. Moreover, unlike in the above described DE 102 45 618 A1, the centering cylinders can be dispensed with. Furthermore, a shut-off valve may for the first time be installed on or in each steering cylinder of the actively steered rear axle, with the result that previously required hydraulic hoses to the steering cylinders can be dispensed with, which provides for an improved straight-running stability and guidance of this rear axle. A shut-off valve within the scope of this invention is a valve which inhibits the flow of hydraulic oil to or from the steering cylinder. This function has previously been used to lock the two hydraulic cylinders in such a way that the current steering position is maintained in the event of an error.

According to another aspect of the present invention, a method is provided for steering a rear axle which comprises wheels of a mobile crane that are arranged thereon, and which is actively steered by a hydraulic steering system. The inventive method enables an error, which affects the steering process performed by means of the hydraulic steering system of the actively steered rear axle, to be detected in a random manner; the affected rear axle is then steered to a predefined desired steering position by selective braking of at least one of the wheels of the affected rear axle.

A faulty active rear axle steering system may for the first time be steered to a predetermined desired steering position without a centering cylinder by using the previously otherwise used method of selectively braking individual wheels of a rear axle in order to adjust the rear axle in its steering position. If necessary, a redundant system of this type is not only able to replace the conventional centering cylinder according to prior art but also other hydraulic components which had previously been required.

In an exemplary embodiment of a method according to the invention, an error is detected by determining a failure of a steering computer of an actively steered rear axle. A steering computer calculates the steering angle required for an associated actively steered rear axle on the basis of values supplied by a setpoint angle sensor of a steered front axle. Whenever there was a steering computer failure in the past, the steering cylinder either had to be disabled so as to maintain the steering position of the actively steered rear axle affected by this failure, or one had to stop immediately. The inventive embodiment ensures that a steering angle is still adjustable to a desired value, and the inventive method of braking individual wheels of the affected rear axle in particular enables one to the return to the straight position.

In another exemplary embodiment of a method according to the invention, an error is detected by determining a failure of the actual angle sensor which is associated with an actively steered rear axle. In prior-art methods, the failure of an actual angle sensor disabled the steering cylinders so that the associated rear axle was locked in its steering position. When the actual angle sensor fails, the steering computer of the prior art rear axle is no longer able to detect the current steering position of this rear axle. By means of the inventive method, at least the rear axle can be kept in the current steering position despite the failure of the actual angle sensor, by selectively braking individual wheels of the rear axle which is affected by the actual angle sensor failure.

In another exemplary embodiment of a method according to the invention, it is provided that if a steering computer of an actively steered rear axle fails, the function of the faulty steering computer is performed by a steering computer of another actively steered rear axle. This enables redundant steering computers to be created which ensure that even if a steering computer of a rear axle steering system fails, the rear axles are still steerable by way of the inventive braking mechanism.

Finally, it is provided in another exemplary embodiment of a method according to the invention that in the event of an error in a steering computer of an actively steered rear axle, a steering computer of another actively steered rear axle takes over control for selective braking of at least one of the wheels of the affected rear axle in such a way that the affected rear axle is steered to a predetermined desired steering position.

For the purpose of a comprehensive discussion, it shall be noted that the above described rear axle steering system according to the present invention is not only applicable in mobile cranes but in other vehicles as well, such as in particular trucks comprising at least one steerable rear axle. The present invention therefore not only relates to a rear axle steering system for mobile cranes but also to a rear axle steering system for vehicles of any type which comprise at least one steerable rear axle.

BRIEF DESCRIPTION OF THE SEVERAL VIEWS OF THE DRAWING

For further explanation and better comprehension, the following is a more detailed description of several embodiments of the present invention by means of the enclosed drawings.

DETAILED DESCRIPTION OF THE INVENTION

An active rear axle steering system according to prior art will at first be explained with reference to FIG. 5 to facilitate comprehension of the invention.

Figure 5:
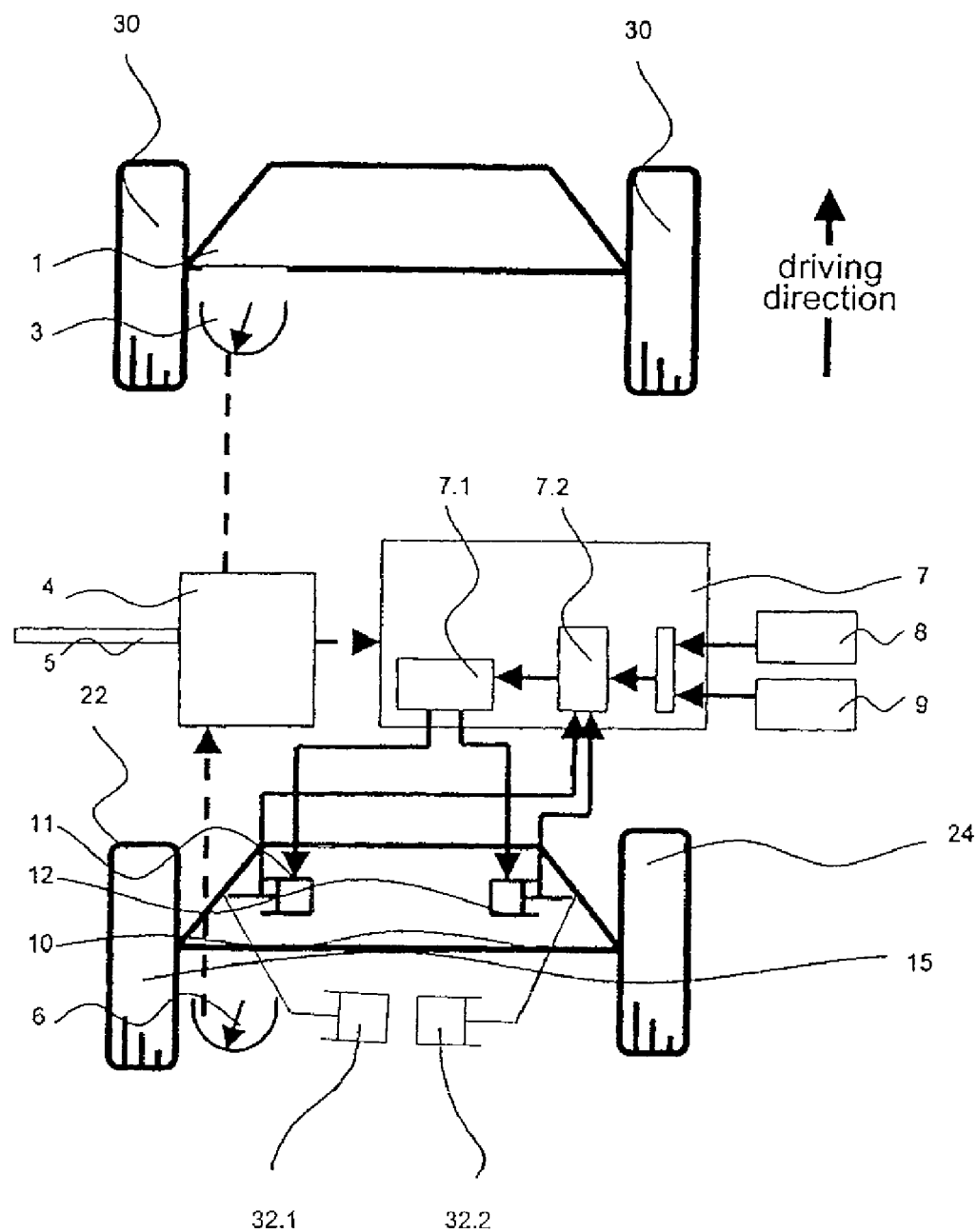
FIG. 5 shows a rear axle steering system according to prior art.

The prior-art system according to FIG. 5 comprises a front axle 1 with two steerable wheels 30. The angular position or steering position, respectively, of the wheels 30 of the front axle 1 is changed by means of a steering wheel (not shown) and a conventional prior-art servo-steering system with a hydraulic support mechanism as well as associated steering linkage. A setpoint angle sensor 3 on the front axle 1 detects the desired steering angle transmitted to the wheels 30 of the front axle 1 by the driver, i.e. by means of the steering wheel, etc. A control computer 4 is connected to the setpoint angle sensor 3 of the front axle 1. In the prior-art mobile crane with an actively steered rear axle 10 shown in FIG. 5, an actual angle sensor 6 is arranged on the rear axle 10 to be steered. Each wheel 22, 24 of the rear axle 10 is in each case associated with a respective steering cylinder 11 or 12 by means of which the wheels 22, 24 of the rear axle 10 are turned to a desired position. The steering cylinders 11, 12 are connected to a hydraulic pump 8 and a hydraulic emergency steering system 9 via an electro-hydraulic block 7 which integrates a proportional valve 7.1 and a shut-off valve 7.2. The electro-hydraulic block 7 is in turn connected to the control computer 4.

The function of this prior-art control system is as follows: The setpoint angle sensor 3 on the front axle 1 detects the driver's steering command and transmits this command to the control computer 4. The control computer 4 also detects the rear axle angle by means of the actual angle sensor 6 as well as the driving program selected by the driver, which is selectable by the driver by means of a switch. A driving program of this type may for instance be "narrow curve", "moving away from the wall", "crab steering (all wheels point in the same direction)", "on-road" "free steering (all wheels of the rear axles are actuated separately and independently of the steering wheel so as to point in the same direction), or the like. The driving speed is transmitted to the control computer 4 by means of a data bus 5, for example.

If the rear axle 10 is not in the desired position, the rear axle 10 is steered to the desired position by actuating the proportional valve 7.1 when the shut-off valve 7.2 is open. At speeds above a defined threshold and in the event of particular errors in the steering system, the shut-off valve 7.2 is disconnected and therefore closed, thus causing the hydraulic oil to be trapped between shut-off valve 7.2 and steering cylinders 11, 12, with the result that the rear axle 10 is hydraulically locked. In other words, this prior-art system illustrates the locking system described at the outset. If in this prior-art system according to DE 102 45 618 A1, the rear axle 10 is to be steered back to the neutral position, the shut-off valve 7.2 is opened and the axle 10 is steered back to the neutral position by means of centering cylinders which are schematically shown in FIG. 5, at 32.1 and 32.2.

Figure 1:
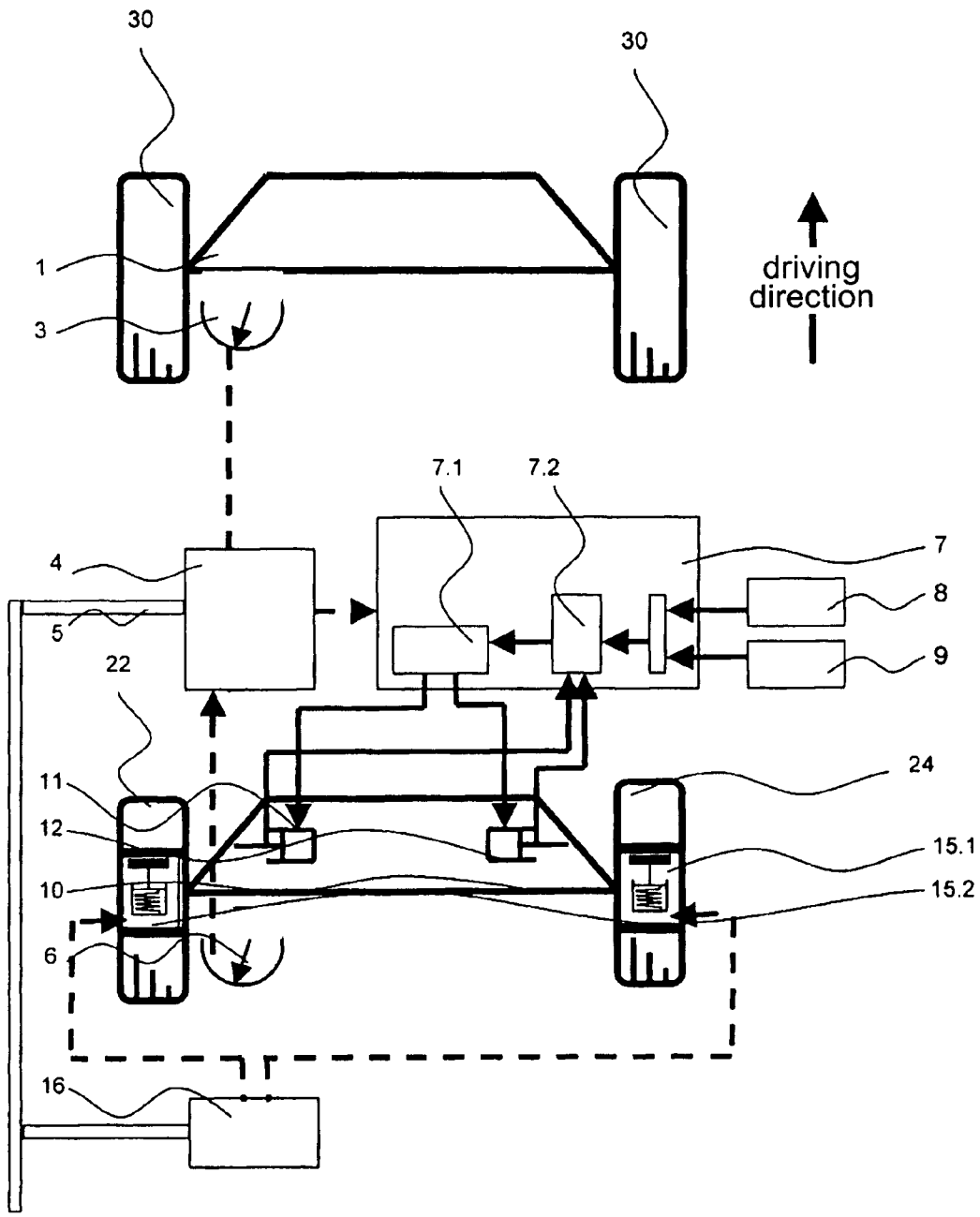
FIG. 1 shows a schematic block diagram of a first exemplary embodiment of the active rear axle steering system according to the invention.

In contrast to that, in the first embodiment of the present invention as it is shown in FIG. 1, a braking system 15 with electro-pneumatic actuators 15.1, 15.2 for selectively braking the wheels 22, 24 in order to achieve a desired steering position in the event of an error. Along with the control computer 4, the embodiment shown in FIG. 1 comprises a control computer 16 for the brake and the associated actuators 15.1, 15.2. In the event of severe steering system errors, the affected rear axle 10 is steered to a desired position by selectively braking the individual wheels 22, 24.

In the embodiment shown in FIG. 1, the safety function is automatically triggered by a steering computer which may be integrated in the control computer 4. In the event of particular errors, such as a failure of the steering computer 4 or of an actual angle sensor 6, steering or centering actions are no longer possible. In such cases, the rear axle 10 would be locked in its current position.

Figure 2:
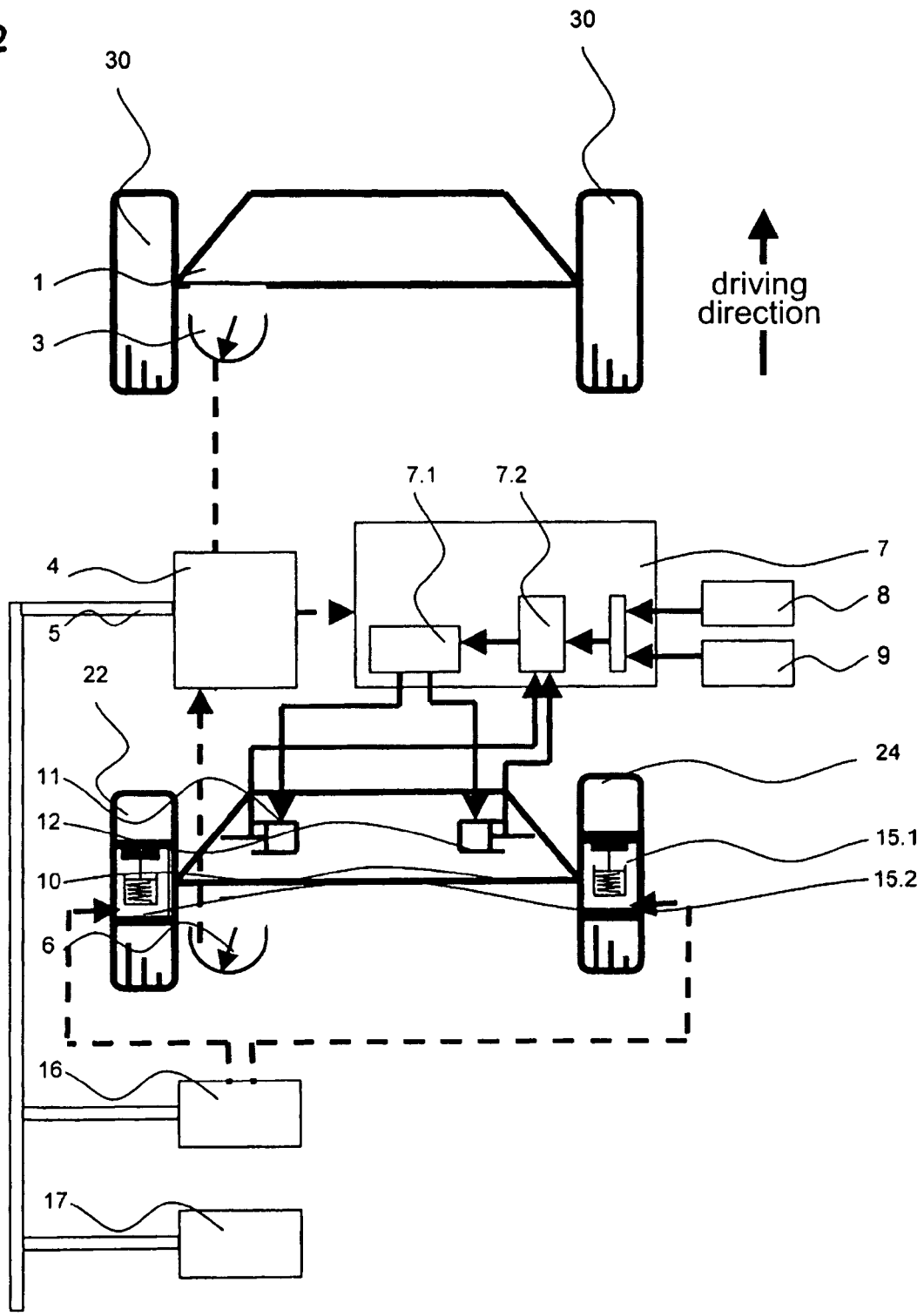
FIG. 2 shows a schematic block diagram of a second exemplary embodiment of The active rear axle steering system according to the invention comprising an additional control computer.

Another exemplary embodiment of the present invention is shown in FIG. 2. Compared to the embodiment shown in FIG. 1, this embodiment additionally comprises a control computer 17. When a steering computer is missing or has failed, this control computer, in other words the control device 17, is able to position the rear axle 10 by braking individual wheels 22, 24. The control device 17 may also be another, already existing vehicle computer, such as a display computer, a central computer or another steering computer. This is the case, for instance, in vehicles with several actively steered rear axles 10 in which the steering computer of another rear axle may then be used as control computer 17.

Figure 3:
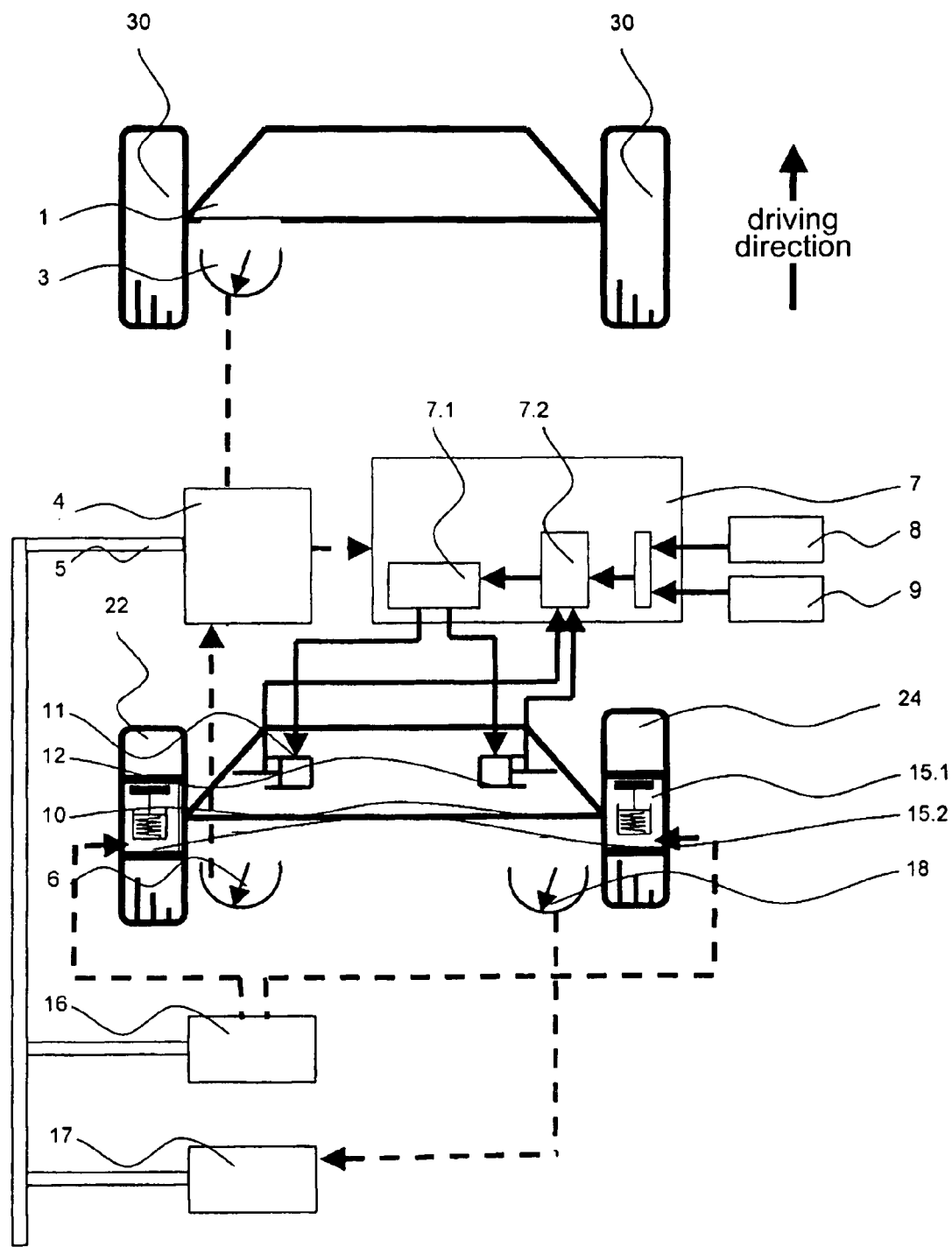
FIG. 3 shows a schematic block diagram of another exemplary embodiment of an active rear axle steering system according to the invention which, in contrast to the embodiment shown in FIG. 2, comprises an additional actual angle sensor on an active rear axle steering system.

A third embodiment of the present invention is shown in FIG. 3. Compared to the embodiments shown in FIGS. 1 and 2, this embodiment includes another, additional actual angle sensor 18. In the event of a faulty actual angle sensor 6, the additional actual angle sensor 18 ensures that the affected rear axle 10 remains positionable by braking the individual wheels 22, 24. Vehicles with several actively steered rear axles 10 may comprise two actual angle sensors 6, 18 for each actively steered rear axle 10 to provide redundancy.

Figure 4:
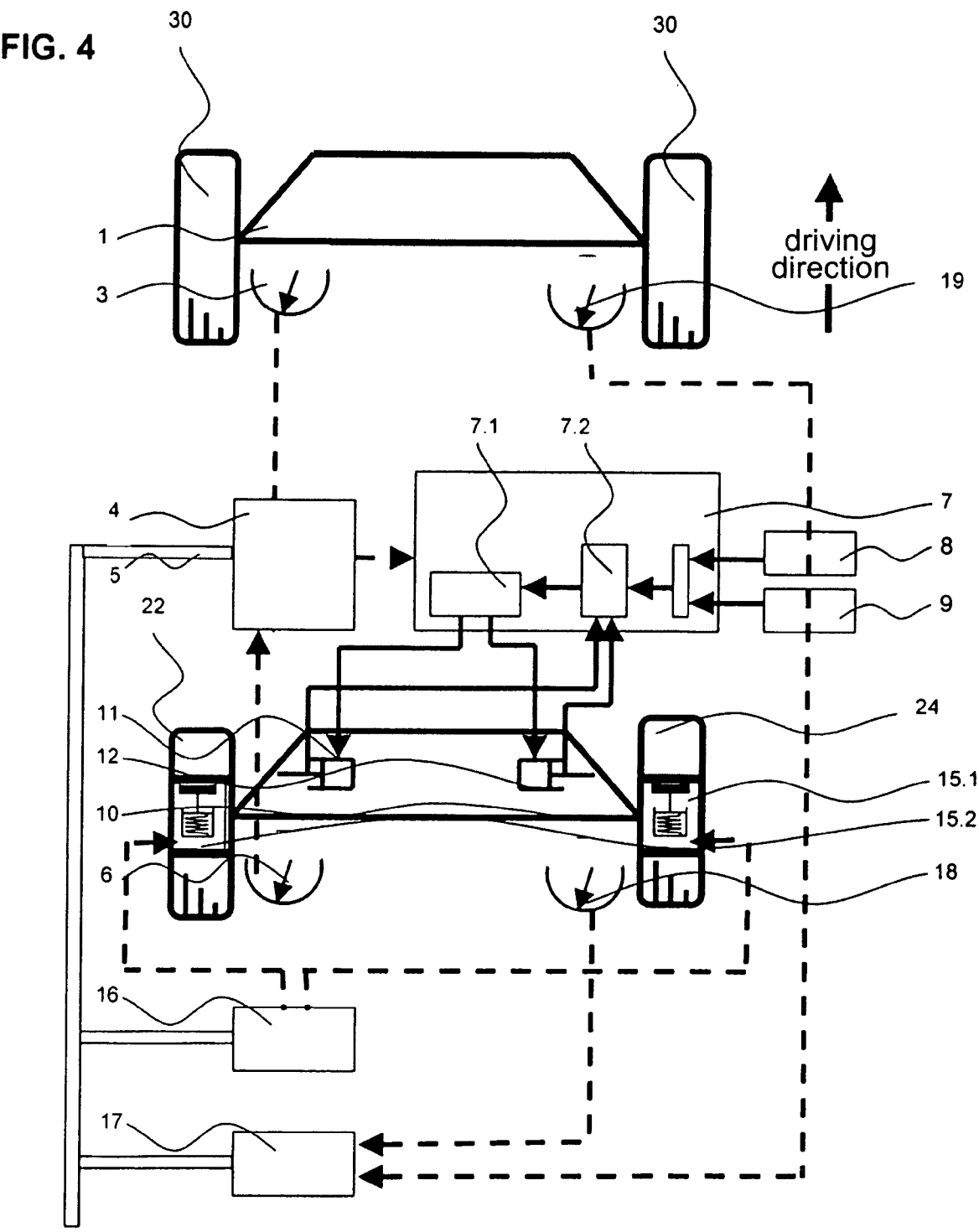
FIG. 4 shows a schematic block diagram of yet another exemplary embodiment Of an active rear axle steering system according to the invention which, in contrast to the embodiment shown in FIG. 3, comprises an additional setpoint angle sensor on a front axle of the vehicle.

Finally, FIG. 4 shows another embodiment of the present invention. Compared to the embodiments of the present invention shown in FIGS. 1 to 3, another setpoint angle sensor 19 is provided on the front axle 1. Even if the first setpoint angle sensor 3 fails, the affected rear axle 10 may still be positioned by braking individual wheels 22, 24; to this end, the second setpoint angle sensor 19 is connected to the additional control computer 17.

In the event of an error which, in prior-art systems, no longer permits steering of a rear axle 10, all of the described embodiments of the present invention allow the affected rear axle 10, strictly speaking the wheels 22, 24 of this rear axle 10, to be positioned in such a way that the vehicle safely remains on the selected or desired track.

It is also possible to design the control system in such a way that when turning a corner, the affected rear axle remains in the desired position, which requires the wheels 22, 24 to be braked specifically.

It is also possible to control the braking of the individual wheels 22, 24 of the affected rear axle 10 by means of the braking mechanism in such a way that the desired steering direction is maintained.

Moreover, the braking mechanism even enables one to drive straight ahead in the zero-degree position, which is again achieved by braking the wheels in a specific manner but which is performable by way of the conventional programs of an ABS control device, an EBS control device or an ASR control device. The programs might require modification. When turning a corner with a rear axle comprising a release system as trailing axle, rear axle 10 would either remain in its current steering position or would be brake-steered, and would be released when driving straight ahead.

Figure 6:
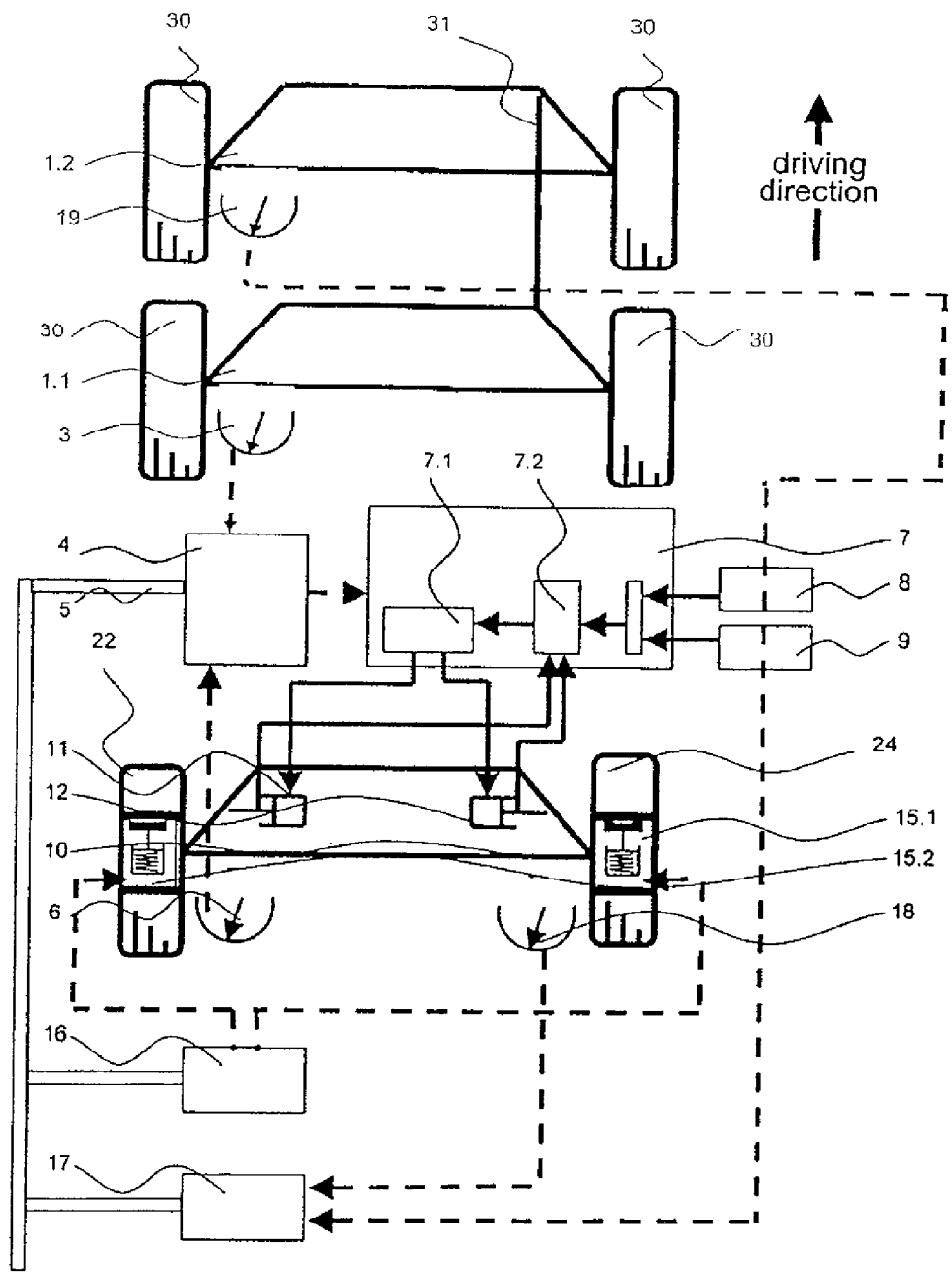
FIG. 6 shows the mobile crane of FIG. 4 having two steered front axle.

FIG. 6 is essentially the same as FIG. 4 except that the mobile crane has two steered front axles 1.1 and 1.2 which are mechanically coupled at 31. The first steered front axle 1.1 is associated with a first setpoint angle sensor 3 and the second front axle 1.2 is associated with a second setpoint angle sensor 19. A control system connects both setpoint angle sensors. In the event of a failure of either the first or second setpoint angle sensors, the rear axle is steered by the other setpoint sensor.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

Figure 7:
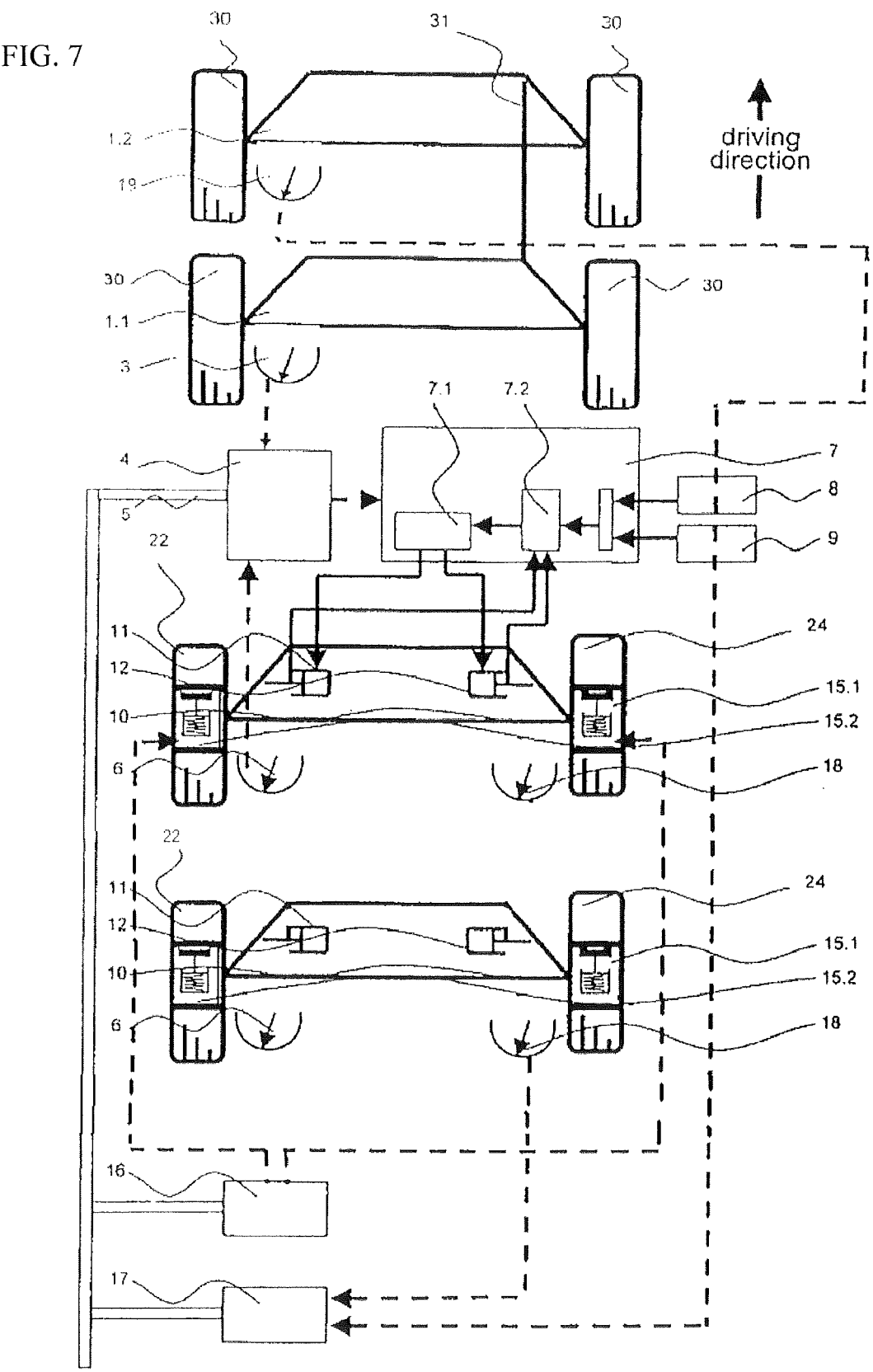
FIG. 7 shows the mobile crane of FIG. 6 having two steered rear axles.

FIG. 7 is essentially the same as FIG. 6 except that the mobile crane has two actively steered rear axles 10. Each axle 10 having an electro-pneumatic actuator 15.1, 15.2 for selectively braking the wheels 22, 24 in order to achieve a desired steering position in the event of an error. Each axle 10 further includes an angle sensor 18 that is connected to a control computer 17. A control system connects the angle sensors 18. In the event of a failure of one of the angle sensors 18 on a given axle, the axle is steered by the other angle sensor.

What is claimed is:

1. A rear axle steering system for a mobile crane having at least one actively steered rear axle with wheels arranged thereon, comprising:

a hydraulic steering system including a first plurality of hydraulic steering cylinders, said first plurality of hydraulic steering cylinders including a centering cylinder and a second plurality of steering cylinders, a said centering cylinder being arranged for centering said at least one steerable axle in the event of an error in said hydraulic steering system; said second plurality of steering cylinders associated with said at least one actively steered rear axle for steering said actively steered rear axle in a desired manner;

a braking system configured for individually individual braking of each wheel of said at least one actively steered rear axle; and a control system for actuating said braking system in the event of said error in said hydraulic steering system, so that a predetermined, desired steering position of said at least one actively steered rear axle is achieved by selective braking of at least one wheel of said at least one actively steered rear axle.

2. The rear axle steering system crane according to claim 1, wherein said mobile crane additionally comprises a steered front axle; a setpoint angle sensor associated with said steered front axle; a first actual angle sensor and a second actual angle sensor associated with said actively steered rear axle; said second actual angle sensor taking over the function of said first actual angle sensor in the event of an error.

3. The rear axle steering system according to claim 1, wherein said mobile crane additionally comprises a steered front axle; a first setpoint angle sensor and a second setpoint angle sensor associated with said steered front axle of said mobile crane; said second setpoint sensor taking over the function of said first setpoint angle sensor in the event of an error.

4. The rear axle steering system according to claim 3, wherein said mobile crane comprises at least two steered front axles mechanically coupled to each other; said first steered front axle of said mobile crane being associated with a first setpoint angle sensor and at least said second steered front axle being associated with a second setpoint angle sensor; and a control system connected with both said setpoint angle sensors; and wherein in the event of a failure of one of the first or second setpoint angle sensors said at least one actively steered rear axle is steered by said other one of said first setpoint sensor and said second setpoint sensor.

5. The rear axle steering system according to claim 1, additionally comprising a control device and wherein in the event of an error in said hydraulic steering system, said control system actuates said braking system by means of said control device so that a predetermined, desired steering position is achieved by selective braking of at least one wheel of said actively steered rear axle affected by said error.

6. The rear axle steering system according to claim 5, wherein said control device is an anti-lock brake system control device, an electronic braking system control device or an anti slip regulation control device; and, in the event of an error in the hydraulic steering system, said braking system selectively brakes by means of said control device at least one wheel of said actively steered rear axle which is affected by said error, so that a predetermined, desired steering position is achieved, and wherein a braking action of said control device is replaced by said selective braking for steering said affected rear axle in a desired manner.

7. The rear axle steering system according to claim 1, wherein said at least one actively steered rear axle includes at least two actively steered rear axles, each of said actively steered rear axles being operably coupled to two of said second plurality of steering cylinders.

8. A rear axle steering system according to claim 7, wherein said hydraulic steering system of each actively steered rear axle comprises a shut-off valve installed on each of said first plurality of hydraulic steering cylinders of said rear axle; each of said first plurality of hydraulic steering cylinders having an inflow and an outflow for hydraulic oil; and said shut-off valve being adapted to inhibit a flow of hydraulic oil in one of the directions comprising said inflow to and said outflow from said first plurality of hydraulic steering cylinders.

9. A method of steering a mobile crane comprising:
providing at least one steerable rear axle including wheels and a hydraulic steering system with no centering cylinder for centering said at least one steerable rear axle after malfunction of said hydraulic steering system;
actively steering said at least one rear axle by said hydraulic steering system;
detecting an error affecting said steering process by means of said hydraulic steering system of said at least one actively steered rear axle; and
selective braking with a control system at least one of the wheels of said affected rear axle so that said affected rear axle is brought to a predetermined, desired steering position.

10. The method according to claim 9, wherein said control system includes a steering computer and said error is detected by determining a failure of said steering computer of said at least one actively steered rear axle.

11. The method according to claim 9, wherein said error is detected by determining a failure of an angle sensor associated with said at least one actively steered rear axle.

12. The method according to claim 9, wherein said mobile crane has at least two actively steered rear axles and wherein said control system includes a first steering computer of a first actively steered rear axle and a second steering computer of a second actively steered rear axle, when said error is an error in said first steering computer, said second steering computer takes over the function of said first steering computer exhibiting said error.

13. A method according to claim 9, wherein said mobile crane has at least two actively steered rear axles and wherein said control system includes a first steering computer of a first actively steered rear axle and a second steering computer of a second actively steered rear axle, wherein when said error is an error in said first steering computer, said second steering computer takes over the control for said selective braking of at least one of the wheels of said affected rear axle for achieving a predetermined, desired steering position of said affected rear axle.

* * * * *